(12) United States Patent
Theiss

(10) Patent No.: US 6,590,968 B1
(45) Date of Patent: Jul. 8, 2003

(54) LOCKOUT APPARATUS FOR CONTROLLING COMMUNICATIONS ON A SINGLE LINE TELEPHONE SYSTEM

(76) Inventor: Daryl Lynn Theiss, 4519 Theiss Rd., Humble, TX (US) 77338

( * ) Notice: Subject to any disclaimer, the term of this patent is extended or adjusted under 35 U.S.C. 154(b) by 0 days.

(21) Appl. No.: 09/520,811

(22) Filed: Mar. 8, 2000

Related U.S. Application Data

(60) Provisional application No. 60/123,186, filed on Mar. 8, 1999.

(51) Int. Cl.[7] .............................................. H04M 1/66
(52) U.S. Cl. ...................................... 379/200; 379/194
(58) Field of Search ................................ 379/188, 199, 379/200, 189

(56) References Cited

U.S. PATENT DOCUMENTS

| | | | | |
|---|---|---|---|---|
| 4,039,759 A | | 8/1977 | Taylor | |
| 4,482,787 A | * | 11/1984 | Sagara et al. | 379/200 |
| 4,683,583 A | * | 7/1987 | Kossor | 379/200 X |
| 5,402,482 A | | 3/1995 | Minohara et al. | |
| 5,448,630 A | * | 9/1995 | Barstow | 379/200 X |
| 5,559,874 A | * | 9/1996 | Panosh | 379/199 |
| 5,566,233 A | | 10/1996 | Liu | |
| 5,694,461 A | * | 12/1997 | Lee | 379/189 |
| 5,832,057 A | | 11/1998 | Furman | |
| 5,864,613 A | * | 1/1999 | Flood | 379/200 |

\* cited by examiner

*Primary Examiner*—Creighton Smith
(74) *Attorney, Agent, or Firm*—Stephen R. Greiner

(57) ABSTRACT

A lockout apparatus for controlling communications on a single line telephone system. The lockout apparatus includes a principal telephone connected to a remote telephone network. A switch is connected in parallel with the principal telephone to the remote telephone network. At least one secondary telephone is connected to the switch such that, when the switch is closed, telephonic communications signals may pass between the principal and secondary telephones and the remote telephone network.

3 Claims, 1 Drawing Sheet

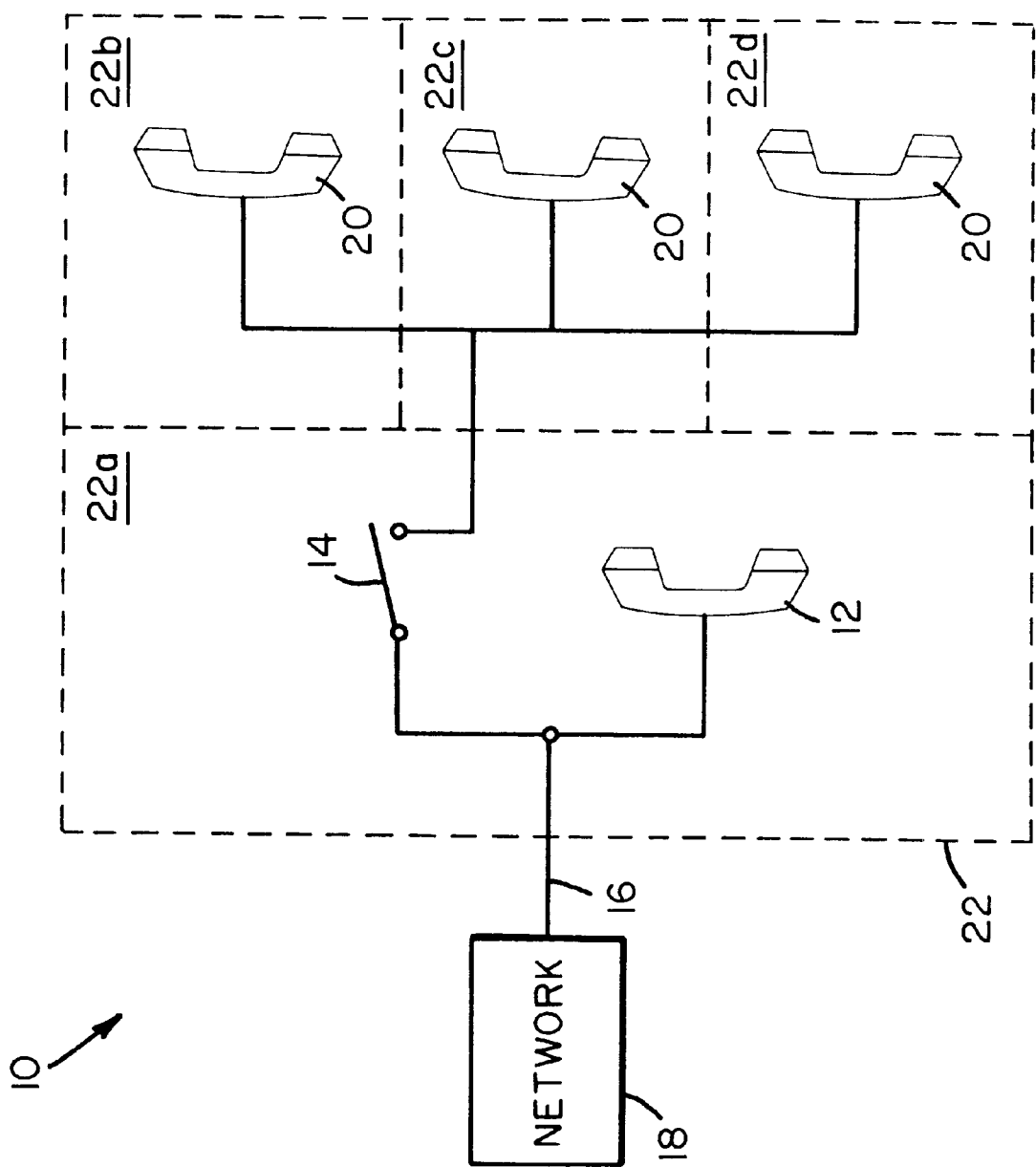

LOCKOUT APPARATUS FOR CONTROLLING COMMUNICATIONS ON A SINGLE LINE TELEPHONE SYSTEM

For priority purposes, this application claims the benefit of Provisional Application for Patent, Ser. No. 60/123,186, filed Mar. 8, 1999.

FIELD OF THE INVENTION

The present invention relates generally to telephonic communication apparatus and, more particularly, to private, single-line lockout systems.

BACKGROUND OF THE INVENTION

Teenaged children often linger for hours on the telephone chatting with out-of-town friends or surfing the Internet running up monthly bills in the hundreds of dollars. While these bills often surprise their guardians who are charged with paying them, there has never been a good way to directly reduce billed sums other than to physically remove telephones from rooms in a home where children have access—often a less that desirable problem solution since the guardians' telephone access is equally restricted. A need, therefore, exists for a lockout apparatus that can be used by an adult to control the connection of a number of telephones positioned throughout his home to a telephone network.

SUMMARY OF THE INVENTION

In light of the problems associated with the telephone apparatus commonly installed in homes, it is a principal object of the invention to provide a lockout apparatus that may be easily employed by a user to selectively control communications on a single line telephone system in his home. Briefly, such an apparatus features a principal telephone connected to a remote telephone network. A switch is positioned adjacent the principal telephone that is connected in parallel with the principal telephone and connected to the remote telephone network. A plurality of secondary telephones are connected to the switch such that, when the switch is manually closed, telephonic communications signals may pass between the principal and secondary telephones and the remote telephone network.

It is an object of the invention to provide improved elements and arrangements thereof in a lockout apparatus for the purposes described which is inexpensive to manufacture, easy to install, and fully dependable in use.

The foregoing and other objects, features and advantages of the present invention will become readily apparent upon further review of the following detailed description of the preferred embodiment as illustrated in the accompanying drawing.

BRIEF DESCRIPTION OF THE DRAWING

The present invention may be more readily described with reference to the accompanying drawing that is a schematic view of a lockout apparatus for controlling communications on a single line telephone system in accordance with the present invention.

DETAILED DESCRIPTION OF THE PREFERRED EMBODIMENT

Referring now to the drawing, a lockout apparatus for controlling communications on a single line telephone system in accordance with the present invention is shown at 10. Apparatus 10 includes a principal telephone 12 connected in parallel with a switch 14 to a cable 16 capable of transmitting telephonic communications signals to a remote telephone network 18. Switch 14 is operatively linked to a plurality of secondary telephones 20 connected in parallel with one another such that, when switch 14 is closed, telephonic communications signals may pass between any of telephones 12 and 20 and network 18. When switch 14 is opened, however, telephones 20 are isolated from network 18 and telephonic communications with network 18 may only be carried out with telephone 12.

Installation of lockout apparatus 10 is straightforward. First, principal telephone 12 is positioned in a secure location (one where children ordinarily do not have 24-hour access) in a home 22 such as a master bedroom 22a and is connected through cable 16 to telephone network 18. Next, switch 14 is positioned in a secure location in home 22, perhaps directly adjacent principal telephone 12 in the master bedroom 22a, and is connected to cable 16 thereby placing it in communication with network 18. Finally, telephones 20 are positioned in desired locations throughout home 22 like the kitchen 22b, living room 22c and a child's bedroom 22d, and, then, they are connected to switch 14.

Use of lockout apparatus 10 is equally uncomplicated. When a parent, guardian or other user desires, as may be the case during daylight hours, switch 14 is closed to permit all of telephones 12 and 20 to access network 18. At night or at other times of a user's choosing, however, switch 14 is manually opened to isolate telephones 20 from network 18 and render them non-operational. Since principal telephone 12 remains in communication with network 18 regardless of the position of switch 14, emergency or other important calls can always be made and received at home 22.

It is believed that apparatus 10 can be easily installed at minimal cost in new construction or retrofit into existing construction. Such costs may be easily recouped in a matter of days in households where telephone use by its teenage members borders on being out of control.

While the invention has been described with a high degree of particularity, it will be appreciated by those skilled in the art that modifications may be made thereto. For example, the number and location of telephones 12 or 20 may be varied in accordance with need. Therefore, it is to be understood that the present invention is not limited to the sole embodiment described above, but encompasses any and all embodiments within the scope of the following claims.

I claim:

1. A lockout apparatus for controlling communications on a single line telephone system, comprising:
   a principal telephone connected to a remote telephone network;
   a switch connected in parallel with said principal telephone to said remote telephone network; and,
   at least one secondary telephone connected to said switch such that, when said switch is closed, telephonic communications signals may pass between either said principal telephone or said at least one secondary telephone and said remote telephone network.

2. A lockout apparatus for controlling communications on a single line telephone system, comprising:
   a principal telephone connected to a remote telephone network;
   a switch connected in parallel with said principal telephone to said remote telephone network; and,
   a plurality of secondary telephones connected to said switch such that, when said switch is closed, telephonic communications signals may pass between said principal telephone and said plurality of secondary telephones and said remote telephone network.

3. A lockout apparatus for controlling communications on a single line telephone system, comprising:
- a principal telephone connected to a remote telephone network;
- a switch connected in parallel with said principal telephone to said remote telephone network, said switch being positioned adjacent said principal telephone; and,
- a plurality of secondary telephones connected to said switch such that, when said switch is closed, telephonic communications signals may pass between said principal telephone and said plurality of secondary telephones and said remote telephone network, said plurality of secondary telephones being connected in parallel with one another.

* * * * *